May 23, 1944.  D. K. HUGHES ET AL  2,349,660
CASH REGISTER
Filed May 23, 1942  2 Sheets-Sheet 1
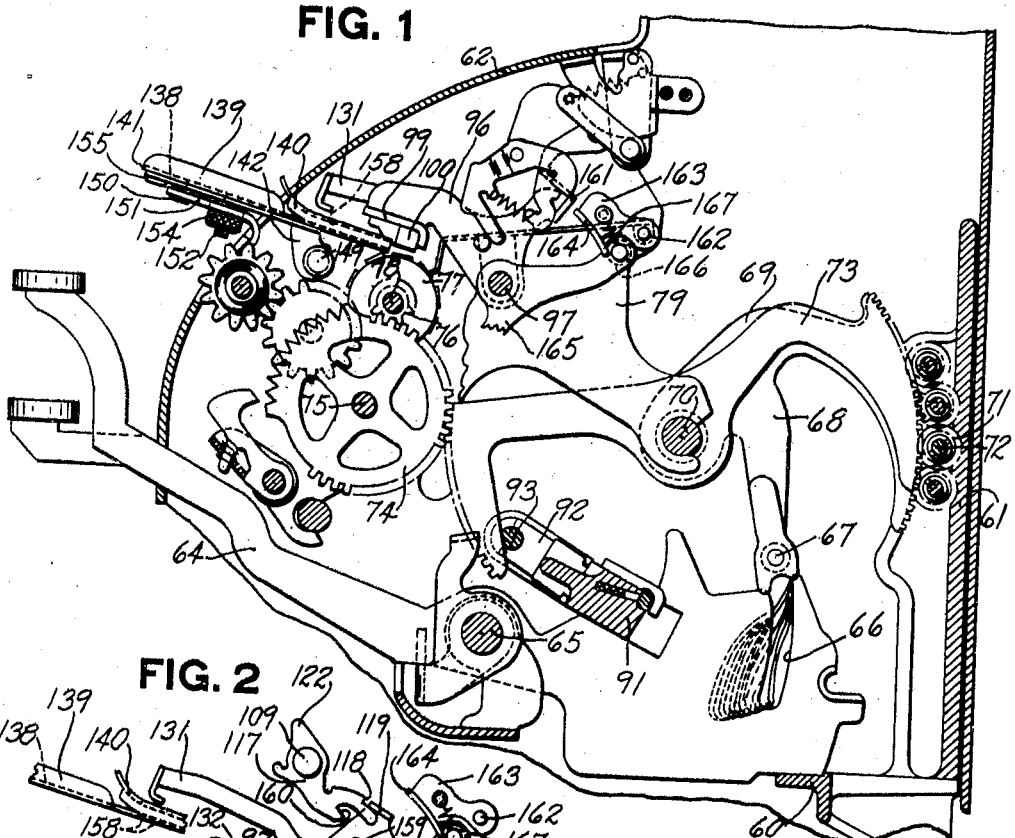
FIG. 1
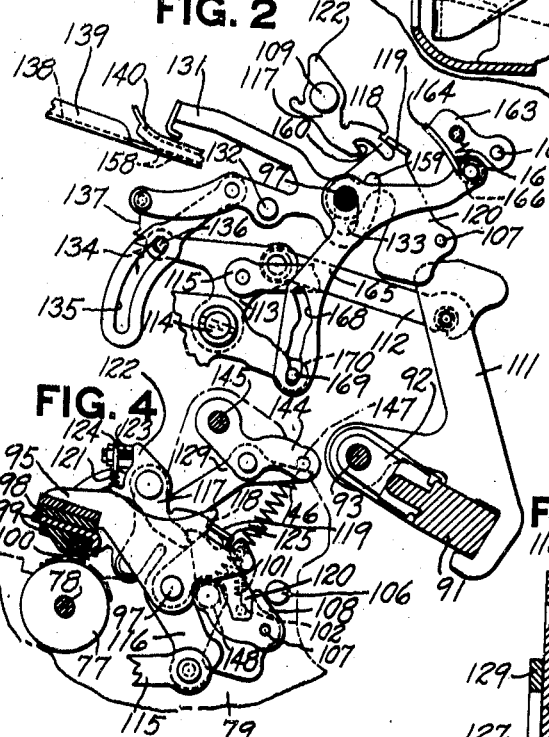
FIG. 2
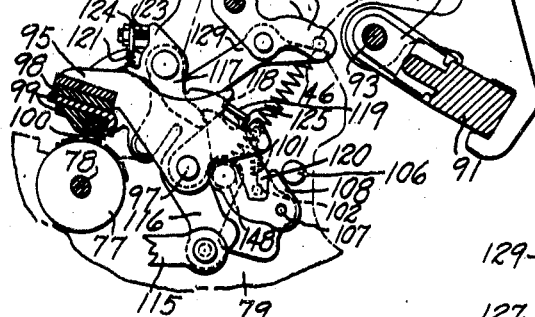
FIG. 3
FIG. 4
FIG. 5
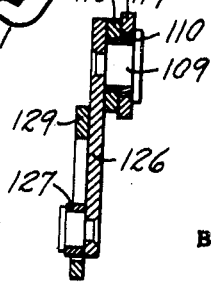
Daniel K. Hughes and
Joseph J. Klosterman, Dec'd
By Mary Klosterman,
Executrix
Inventors
By *Pearl Burnet*
Their Attorney May 23, 1944.  D. K. HUGHES ET AL  2,349,660
CASH REGISTER
Filed May 23, 1942  2 Sheets-Sheet 2
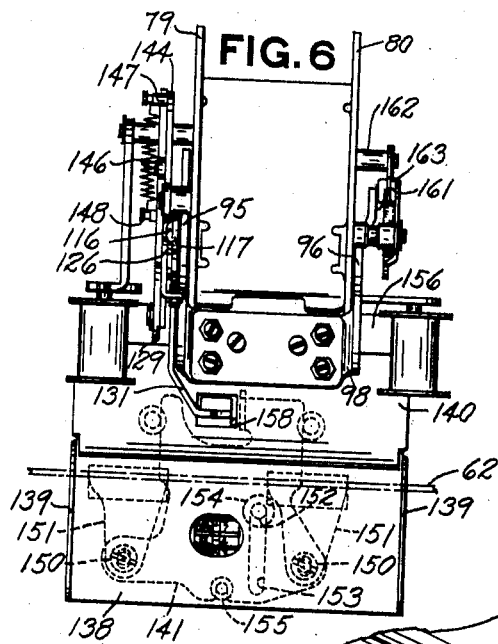
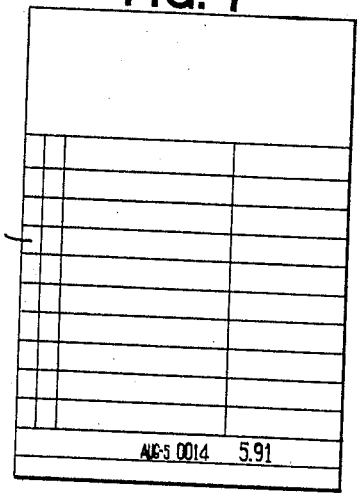
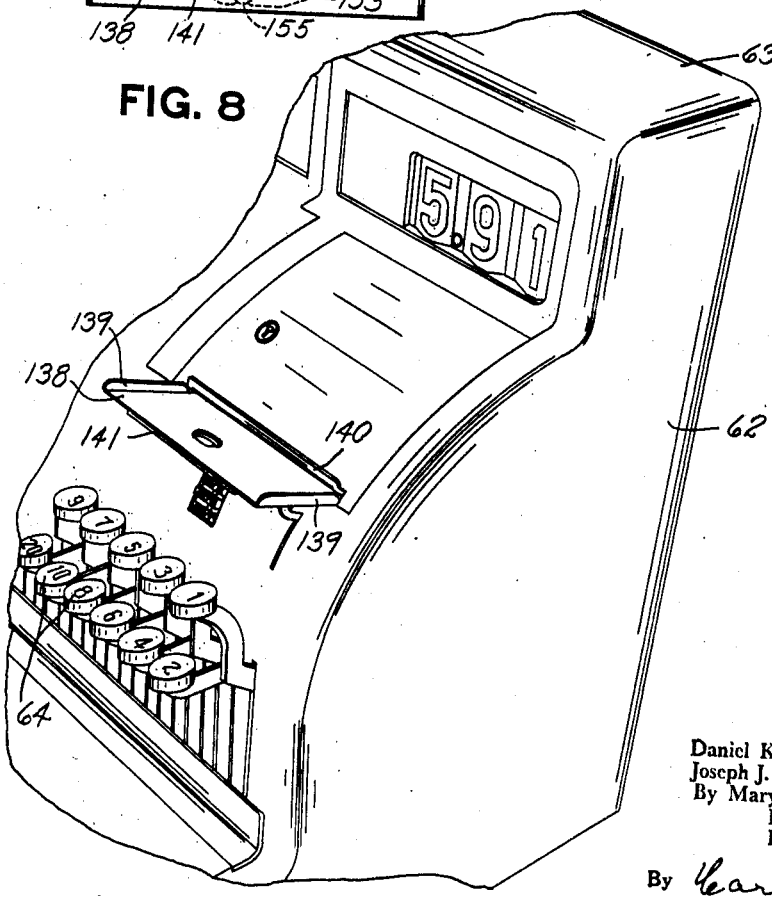
Daniel K. Hughes and
Joseph J. Klosterman, Dec'd
By Mary Klosterman,
Executrix
Inventors
By Earl Bernst
Their Attorney Patented May 23, 1944

2,349,660

UNITED STATES PATENT OFFICE 2,349,660

CASH REGISTER

Daniel K. Hughes, Dayton, Ohio, and Joseph J. Klosterman, deceased, late of Dayton, Ohio, by Mary Klosterman, executrix, Dayton, Ohio, assignors to The National Cash Register Company, Dayton, Ohio, a corporation of Maryland Application May 23, 1942, Serial No. 444,222

3 Claims. (Cl. 101—93)

This invention relates to cash registers and accounting machines and has more particular reference to novel interlocking devices affecting the printing mechanisms of such machines.

The printing mechanism of the present invention is adapted to be used in connection with key-operated or "press-down-keys" types of registers generally and, as illustrated in the accompanying drawings, is particularly well suited for machines of the types disclosed in application for Letters Patent of the United States, Serial No. 226,690, filed August 25, 1938, by Daniel K. Huges, which issued into Patent No. 2,297,961 on October 6, 1942, and in application for Letters Patent of the United States, Serial No. 207,244, filed May 11, 1938, by Frank R. Werner, which issued as Patent No. 2,279,805 on April 14, 1942.

Machines of the above type are generally used in connection with business systems in which checks or slips are manually prepared for each customer by writing on said slips the various items purchased and the total amount to be charged therefor. The slip is then inserted into the machine, and the total amount thereon is entered into the machine, resulting in such amount being added upon the totalizer and printed upon said slip. Each slip bears printed instructions to the customer to pay only the printed amount on the slip, thereby making it imperative to record such amount in the machine before receiving payment thereof.

Heretofore, in machines of this type, it was possible for the operator to partially operate the machine by depressing the keys and holding said keys in their depressed position, which releases the printing hammer for operation, and then manually operating said printing hammer any number of times to fraudulently print amounts on a plurality of inserted slips, without recording such amounts on the totalizer of the machine. The instant invention provides novel interlocking means for rendering the printing hammer operable only once during each operation of the machine, thus preventing any manual operation of the printing hammer and assuring that the amount printed is properly recorded on the totalizer.

In some instances, it is desirable to operate the machine without printing on an inserted slip, and consequently at such times there is no need for having the printing mechanism operate. The present invention, therefore, provides means for rendering the printing mechanism inoperable when the machine is operated without a slip inserted therein.

It is, therefore, an object of the invention to provide improved and simplified means for preventing more than one operation of the printing mechanism during an operation of the machine.

Another object of the invention is to provide an interlocking means, which is actuated when the machine is operated, to prevent more than one operation of the printing hammer.

Another object of the invention is the provision, in mechanism of the class described, of an interlock which has only a few parts and is positive in its action and hence inexpensive to manufacture.

A further object of the invention is to provide novel means for rendering the printing mechanism inoperable when the machine is operated without a slip therein.

A still further object is to provide means for rendering the printing mechanism operable once during each operation of the machine with a slip therein.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a section through the machine, showing the differential drive mechanism and the printing mechanism actuated thereby.

Fig. 2 is a detail of the feeling member for controlling the operativeness of the printing mechanism and a portion of the interlocking means for preventing more than one operation of said mechanism during a machine operation.

Fig. 3 is a detail of the mechanism for actuating the printing hammer.

Fig. 4 is a detail of the printing hammer and a portion of the means for actuating the same.

Fig. 5 is a section, in enlarged scale, on line 5—5 of Fig. 3, looking in the direction of the arrows.

Fig. 6 is a top plan view of the paper chute and the feeling member for coacting therewith to control the operativeness of the printing hammer.

Fig. 7 is a facsimile of the slip or check used with the illustrated machine.

Fig. 8 is a perspective view of a portion of the machine embodying the invention.

General description

The preferred form of the present invention is illustrated herein as applied to a key-operated or "press-down-key" type of cash register provided with a plurality of denominational groups or sets of keys. As in most machines of this type, depression of one or more amount keys operates the register to set indicators to display the amount of the transaction and adds the amount on the totalizer. In addition to these functions, the present invention provides a printing mechanism to print the amount on an inserted slip.

Since the present invention relates more particularly to the printing mechanism, illustrations and descriptions of the indicating mechanism and the totalizer are omitted from the drawings and specification comprised in this application.

More specifically, the present invention relates to interlocking means between the printing hammer and the means for actuating the same. The invention also includes means for preventing operation of the printing hammer when the machine is operated without a slip therein.

Detailed description

Only those details of the printing mechanism and the means for actuating the same which are necessary for an understanding of the instant invention will be described herein. For further details of these mechanisms, reference may be had to the above-mentioned patents of Hughes and Werner.

Framework

The main body of the machine is supported between a pair of the usual type of side frames (not shown) supported on a base 60 secured to a back plate 61 (Fig. 1).

A suitable casing or cabinet 62 encloses the framework of the machine, the casing having an upward extension to form a cupola or dome 63 to enclose the indicators. The lower portion of the casing is suitably formed to accommodate a cash drawer, which is not shown herein, as it has no bearing on the present invention.

The cabinet 62 is provided with openings for access to certain parts of the mechanism. Such openings have lids or doors with locks to prevent unauthorized persons from having access to the inner parts of the machine.

Keyboard

The full complement of the keyboard of the machine selected to illustrate the present invention includes a plurality of denominational banks or groups of amount key levers 64, the forward ends of which bear captions designating the values assigned to the different keys. As the corresponding keys of each of the denominational groups of amount keys are substantially alike, but one group of keys will be described herein.

Differential mechanism

The keys 64, illustrated in Fig. 1, are the "tens of cents" keys, all of which are journaled intermediate their ends on a universal rod 65 extending between and supported in the machine side frames. The rearwardly extending arm of each of the keys 64 is provided with a differential cam slot 66 open at one end and adapted to cooperate with a rod 67. The rod 67 is supported at one end by an arm 68 of a segment 69 freely mounted on a rod 70 supported by the machine side frames, while the other end of said rod 67 is similarly supported by an arm of a segment (neither of which is shown, but like the arm 68 and the segment 69) also freely mounted on the rod 70. Depression of a key 64 engages the mouth of the slot 66 with the rod 67, and continued depression of the key rocks the rod 67 and the segment 69 clockwise a distance corresponding to the value of the key 64 depressed.

The differential adjustment which the rod 67 and the segment 69 receive, through the depression of the keys 64, is transmitted by means to be presently described to the type wheels and the totalizer wheels. This means includes teeth formed on the segment 69, which mesh with one of a plurality of pinions 71 (only one of which is shown) secured to a transmission shaft 72 suitably journaled in the machine side frames. One of the other pinions 71 controls the actuation of the totalizer, which is fully shown and described in the above-mentioned Werner patent and therefore will not be described herein. Another one of the pinions 71 meshes with a rearwardly extending toothed arm of a double-ended segment 73 pivotally mounted on the rod 70. A forwardly extending toothed arm of the segment 73 meshes with teeth on a gear 74 to impart differential movement thereto corresponding to the value of whichever key 64 is depressed. The gear 74 is pivotally mounted on a rod 75, suitably supported in the machine, and meshes with a pinion 76 secured to a type wheel 77, both said pinion and said type wheel being loosely mounted on a shaft 78 journaled in a pair of printer side frames 79 and 80. The gear 74 will, through the pinion 76, impart differential adjustment to the type wheel corresponding to the value of the depressed key 64.

Key coupler

Depression of a key 64 also rocks a key coupler 91 (Fig. 1) counter-clockwise. The key coupler 91 normally lies across all of the keys 64, to the rear of the rod 65, and maintains the keys in their home positions, as determined by the base 60. The coupler 91 is carried by a pair of arms 92 (only one of which is shown) pivotally mounted on a rod 93 secured in the machine side frames. The limit of counter-clockwise movement of the coupler is reached when the outer end of the key reaches its limit of downward travel, whereupon the operator releases the key and the weight of the key coupler 91 rocks the key clockwise to restore it to its normal undepressed position. The key, on its restoring movement, causes the type wheel 77 associated therewith to be returned to its zero position.

The totalizer is engaged with the actuators upon the downward travel of the depressed key, to record the amount corresponding to the value of such key, and is disengaged from the actuator upon the restoring movement of the key depressed, all of which is shown and described in the before-mentioned Hughes patent.

Printing mechanism

After the type wheels 77 are adjusted through the depression of keys 64, an impression hammer is operated to take an impression from said wheels onto an inserted slip 94 (Fig. 6). The impression hammer and the actuating means therefor will now be described.

The impression hammer comprises a pair of spaced arms 95 and 96 (Figs. 1 and 4) pivoted on a cross rod 97 secured in the frames 79 and 80. The arms 95 and 96 have formed integral therewith a cross brace 98. An inverted channel bar 99, secured to the under side of the cross brace 98, carries a platen 100 adapted to be rocked into contact with the type on the type wheels 77 to take an impression therefrom. A spring 101 (Fig. 4), fastened at one end to the arm 96 and at its other end to a stud 102, to be described later, normally serves to hold the platen 100 away from the type wheels 77.

Access to the printing mechanism to change the ribbon and for other legitimate purposes may be had by opening a hinged lid or door 103 (Fig. 8).

The means for actuating the printing hammer will now be described.

An arm 111 is pivotally mounted on the rod 93 and is shaped to embrace the free end of the key coupler 91, so that, when the key coupler is rocked counter-clockwise upon depression of the key 64, the arm 111 will receive such counter-clockwise movement, and, when the key coupler 91 is allowed to restore in a clockwise direction to its home position, the arm 111 will be moved clockwise to its home position, shown in Fig. 2.

This arm 111 is connected by link 112 to a lever 113 secured to a shaft 114 suitably journaled in the printer frames 79 and 80. This lever 113 (Figs. 2 and 3) is connected by link 115 to a lever 116 pivoted on the rod 97.

From the above connection, it will be clear that the counter-clockwise movement of the arm 111 is transmitted through the train of mechanism just described to drive the lever 116 in a clockwise direction and that the return clockwise movement of the arm 111 will drive the lever 116 counter-clockwise to its normal position.

The lever 116 has a hub 110 (Fig. 5), upon which is pivoted a hammer-cocking pawl 117 (Figs. 2 to 5) having a shoulder 118 adapted to coact with a flange 119 of an arm 120 pivoted on the rod 97. The arm 120 carries the previously-mentioned stud 102, to which is secured one end of the spring 101, the other end of said spring being secured to the arm 95 to hold the printing hammer platen 100 normally away from the type wheel 77, as previously described. This hammer-cocking pawl 117 has a tail 122 normally held against an adjusting screw 123 by a spring 121. This adjusting screw 123 is carried by a flange 124 of an arm 126 having a shouldered stud 109 projecting through the hub 110 of a lever 116. This stud 109 has a large head to retain the pawl 117 in the proper position on the hub 110. By means of this construction, there can be independent pivoting of the hammer-cocking pawl 117 and the arm 126 as they are moved towards the right (Fig. 3) by the clockwise movement of the lever 116.

The arm 126 carries a roller 127, which co-operates with a cam slot 128 in a link 129 carrying a stud 130, by means of which this link 129 is pivoted to the lever 116. The link 129 is also pivoted near its upper end to an arm 144 (Fig. 4), which in turn is pivotally mounted on a stud 145 secured to the frame 79. A spring 146 is connected to a stud 147 secured to the arm 144 and to a stud 148 on a buffer arm 108 pivoted at 107 to the arm 120, and is adapted to actuate the printing hammer to take an impression from the type wheels 77 after the hammer has been fully cocked and released in a manner to be described hereinafter.

From the above description, it can be seen that, when the lever 116 is rocked clockwise (Fig. 3), the link 129 is moved to the right around the rod 97 as a fulcrum, and, at the same time, the pawl 117 is moved to the right around the same rod 97, thus, through the engagement of its shoulder 118 with the flange 119, rocking the arm 120 clockwise around the center of the rod 97. As the link 129 and the pawl 117 are being rocked around the center of the rod 97, the cam slot 128 of the link will, through the arm 126, rock the cocking pawl 117 clockwise around its pivot stud 109 as said pawl 117 is being rocked around the center of the rod 97 during the time the arm 120 is being rocked clockwise in the manner described above. During this clockwise movement of the arm 120, the spring 101 rocks the hammer arms 95 and 96 clockwise, thus raising the platen 100 away from the type wheels to cock the hammer. The movement of the link 129 to the right, as above described, and the simultaneous movement of the arm 120 clockwise stretch the spring 146, thus putting a sufficient tension therein to take the impression from the type wheels 77 on the inserted slip when the shoulder 118 of the cocking pawl 117 slips underneath the flange 119 of the arm 120 due to the continued clockwise movement of the pawl 117 around the stud 109. When this release of the arm 120 from the pawl 117 takes place, the tension of the spring 146 overcomes the strength of the spring 101, causing a very quick clockwise movement of the arms 95 and 96 to cause the platen 100 to take an impression from the type wheels, as above mentioned. This overcoming of the spring 101 is the last movement of the arms 95 and 96, which is the actual overthrow equal to the distance of the clearance between the flange 119 and the side of the fork of the arm 95. At the time the printing takes place, the buffer arm 108 strikes the pin 106, thus absorbing the shock of the spring 146 to prevent the excessive wear on the flange 119.

The actual impression is made at approximately the same time that the forward end of the key reaches the bottom of its downward stroke, and, when the key is released, the key coupler 91, as above mentioned, moves clockwise to its normal position, whereupon the arm 111, through the links 112 and 115 and the lever 113, rocks the lever 116 counter-clockwise to its normal position and the pawl 117 is restored to the position shown in Fig. 3 by the cam slot 128 acting on the arm 126 as the link 129 is moved to its normal position.

When the instant machine is operated without a slip inserted therein, there is no need for operating the printing mechanism. The present invention, therefore, provides means for rendering the printing mechanism inactive when the machine is operated without a slip therein. The means by which this result is accomplished will now be described.

A feeler 131 (Figs. 1 and 2) is provided for controlling the operativeness of the printing mechanism. The feeler 131 is pivotally mounted on a stud 132 secured in the left printer frame 79, and the rearward portion of said feeler is provided with a slot 133, through which projects the rod 97. The feeler 131 has pivoted thereto an arm 134 having an arcuate-shaped slot 135, through which projects a stud 136 carried by the lever 113. In the normal position of the lever 113, the stud 136 coacts with the wall of the upper end of the slot 135 to hold the feeler 131 in its normal ineffective position, against the action of a spring 137 connected to the feeler 131 and to a stud (not shown) mounted in the printer frame 79.

The instant machine is provided with a slip table 138 having guide flanges 139 (Figs. 1, 6, and 8) and a chute 140 for guiding the slip 94 into position to have the total amount printed thereon. The table 138 and the integral chute 140 are slidably mounted on a plate 141 provided with an ear 142, which is bifurcated to embrace a rod 149 secured in the printer frames 79 and 80. This plate 141 is also secured by means of screws 150 to a pair of brackets 151 (Figs. 1 and 6) secured to the cabinet 62. The table 138 has a threaded stud 152 projecting through a guide slot 153 in the plate 141, and a thumb nut 154 is used to lock the table in any adjusted position. A headed stud 155 acts as a stop for and assists in guiding the table 138. To permit easy access to an inking ribbon 156 (Fig. 6) carried on spools 157, the table may be slid forward after the thumb nut 154 is loosened. The ribbon feed mechanism is not shown. The chute 140 is provided with an aperture 158 in both the top and the bottom sections thereof, with which aperture the feeler 131 is adapted to cooperate to control the operativeness of the printing mechanism.

When the key coupler 91 and the arm 111 are rocked counter-clockwise, through the depression of a key 64, the lever 113 is likewise rocked counter-clockwise. Such movement of the lever 113 will move the stud 136 downwardly in the slot 135, thereby permitting the spring 137 to rock the feeler 131 counter-clockwise to cause the latter to move towards the aperture 158 in the chute 140, and if, at this time, there is no slip 94 in the chute 140, the free end of the feeler 131 will move through the aperture 158 in both the top and the bottom sections of the chute 140. When the feeler 131 moves counter-clockwise to the extent just mentioned, a tail 159, formed integral with the rear end of the feeler 131, will engage a notch 160 formed in the pawl 117 and rock the latter clockwise to move the shoulder 118 below the flange 119. Then, upon the clockwise movement of the lever 116 and the pawl 117 around the center of the rod 97 preparatory to operation of the printing hammer, the shoulder 118 on the pawl 117, being below and out of cooperative relationship with the flange 119 on the arm 120, cannot rock the hammer arms 95 and 96. Consequently, the printing hammer will not be actuated, due to the absence of a slip 94 on the table 138.

On the other hand, if a slip 94 is inserted in the chute 140 and the machine operated, the feeler 131 will pass through only the aperture 158 in the top section of the chute 140 and then contact the inserted slip, which arrests downward movement of the feeler 131, and therefore this short counter-clockwise movement of the feeler 131 is insufficient to engage the tail 159 with the notch 160 in the pawl 117; consequently the shoulder 118 thereof will remain in a position for coacting with the flange 119 to rock the arm 120 clockwise to cock the hammer arms 95 and 96, whereupon the platen 100 will cause a print on the inserted slip 94.

To obviate any fraudulent manipulation of the present machine at the end of the down stroke of the key or at the end of the up stroke, when the door 103 is open, by manual operation of said printing hammer any number of times to print amounts on a plurality of slips without recording each of such amounts in the totalizer, the present invention provides locking means for preventing operation of the printing hammer during such times, thereby assuring that all amounts printed on the slips are properly recorded in the totalizer. The means for accomplishing this result will now be described.

The right-hand arm 96 (Fig. 1) of the printing hammer is provided with a flange 161. Pivotally mounted on a stud 162 secured in the frame 80 is a pawl 163 provided with an arcuate-shaped flange 164 concentric with the pivotal point of the arm 96. Loosely mounted on the rod 97 is a lever 165, the upper arm of which carries a stud 166, against which the pawl 163 is normally held by a spring 167. The normal position of the pawl 163 is such that the flange 164 is directly in the path of travel of the flange 161 on the arm 96 at the beginning and end of a machine operation and also at the end of the down stroke of the key, which is immediately after taking an impression from the type wheels 77. When the pawl 163 is in this position, it will prevent manual operation of the printing hammer. The lower arm of the lever 165 (Fig. 2) is provided with an irregularly-shaped cam slot 168, through which projects a stud 169 carried by one arm of the lever 170 secured to the shaft 114.

As heretofore described, the shaft 114 is rotated first counter-clockwise and then clockwise through the movement imparted to the key coupler 91 by the operation of the key (Fig. 4). The configuration of the slot 168 in the lever 165 is such that, during the counter-clockwise movement of the lever 170, the stud 169 will cam the lever 165 first counter-clockwise and then clockwise back to its normal position. Upon the counter-clockwise movement of the lever 165, the stud 166 will coact with the pawl 163 to rock the latter clockwise against the action of the spring 167 to remove the upper end of the flange 164 out of the path of movement of the flange 161 on the arm 96 to permit operation of the printing hammer after the adjustment of the type wheel 77 is completed, which occurs near the end of the downward movement of the key 64. Immediately after the flange 161 clears the upper end of the flange 164, the lever 165 receives its clockwise movement back to normal position, whereupon the spring 167 tends to rock the pawl 163 counter-clockwise to its normal position. However, at this time, the arm 96 has moved sufficiently clockwise so that the arcuate-shaped side of the flange 164 will bear lightly against the flange 161 without interfering with the clockwise movement thereof during the cocking of the hammer. When the printing hammer is rocked counter-clockwise to take an impression from the type wheels 77, the flange 161 on the arm 96 will move from beneath the flange 164 on the pawl 163, whereupon the spring 167 will move the pawl 163 farther counter-clockwise to position the upper end of the flange 164 thereof in the path of travel of the flange 161 on the arm 96, thereby preventing a repeat operation of the printing mechanism after the regular impression has been taken.

Upon the return clockwise movement of the shaft 114 and the lever 170 to their normal positions, the lever 165 is again rocked first counter-clockwise and then clockwise through the coaction of the stud 169 with the cam slot 168, thereby operating the pawl 163 in the same manner as that above described, and leaves the pawl 163 in the path of the flange 161 at the end of the machine operation to prevent any manual cocking of the printing hammer between operations of the machine.

Operation

The interlock mechanisms provided by the present invention are simple in construction, inexpensive to manufacture, and positive in their operation. Such mechanisms prevent any fraudulent manipulation of the machine in a manner previously described herein, as well as render the printing mechanism inoperable when the machine is operated without a slip therein.

Since the operation of the above-mentioned interlock mechanisms has been thoroughly discussed previously herein, it is not thought necessary to repeat a detailed description thereof.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine adapted to print on inserted record material, the combination of type carriers; a platen for printing from said type carriers; driving connections for cocking the platen, including a pawl normally in a position to be effective to cock the hammer when the driving connections are operated; and a feeler to feel for the presence of record material in the machine, an integral part of the feeler coacting with the pawl to move the pawl out of effective position when no slip is present in the machine, to disable the driving connections to thereby prevent cocking of the hammer.

2. In a machine of the class described, having a receptacle to receive an insertable slip, said receptacle provided with an aperture, a plurality of type carriers; impression means operable to take an impression from said type carriers and print the same on an inserted slip; operating mechanism for the impression means, including a pawl normally in position to drive the impression means but movable out of driving position; means including a feeler element movable through the aperture in said receptacle when no slip is present in the receptacle; and a projection forming an integral part of said feeler coacting with said pawl when the feeler enters said aperture to move said pawl out of driving position to thereby prevent operation of the impression means.

3. In a machine of the class described, having a plurality of operating keys; a plurality of type wheels differentially adjustable under control of said keys; and a coupler associated with said keys and adapted to be actuated thereby, the combination of a receptacle for receiving an insertable slip; a lever; connecting means between said coupler and said lever for rocking the lever upon actuation of the coupler; pivotally mounted impression means operable to take an impression from said type wheels to print the same on an inserted slip; a spring normally urging said impression means into cooperative relationship with said type wheels; a pivotally mounted arm operatively connected to said impression means and provided with a flange; a pawl pivotally mounted on said lever and movable therewith, said pawl being provided with a shoulder normally engaging said flange so that upon pivotal movement of the lever the shoulder will normally coact with the flange on said arm to rock the arm, together with the impression means, against the action of the spring; means to rock the pawl on its pivot until the shoulder clears the flange, whereupon said spring rocks said impression means into cooperative relationship with the type wheels; a notch in said pawl; and means for coacting with said receptacle which, when the machine is operated without a slip in said receptacle, coacts also with the notch in said pawl to rock the latter to cause the shoulder thereon to move beneath the flange on the arm to render the impression means inoperable.

DANIEL K. HUGHES.
MARY KLOSTERMAN,
*Executrix of the Estate of Joseph J. Klosterman, Deceased.*